United States Patent

Gardberg

[15] 3,654,538
[45] Apr. 4, 1972

[54] BATTERY BOOSTER CIRCUIT CONTAINING VOLTAGE SENSING MEANS

[72] Inventor: Joseph Gardberg, 585 W. 51st Street, Hialeah, Fla. 33016

[22] Filed: Jan. 19, 1970

[21] Appl. No.: 3,866

[52] U.S. Cl. ................................ 320/7, 320/15, 320/25, 320/98
[51] Int. Cl. ........................................................ H02j 7/00
[58] Field of Search .................. 320/7, 15, 22, 25, 26, 48; 307/138

[56] References Cited

UNITED STATES PATENTS

| 3,129,372 | 4/1964 | Warren | 320/15 |
| 3,217,225 | 11/1965 | Gottlieb et al. | 320/25 X |
| 3,258,672 | 6/1966 | Godshalk et al. | 320/25 |
| 3,281,816 | 10/1966 | Raymond | 320/25 UX |
| 3,341,762 | 9/1967 | Rockoff | 320/25 X |
| 3,343,057 | 9/1967 | Smith | 320/25 X |
| 3,456,181 | 7/1969 | Godshalk | 320/25 |
| 3,105,910 | 10/1963 | Chambers | 320/2 |

Primary Examiner—William M. Shoop, Jr.
Attorney—Johnston, Root, O'Keeffe, Keil, Thompson & Shurtleff

[57] ABSTRACT

A battery booster circuit for use in conjunction with an emergence or road service vehicle for aiding stalled or disabled vehicles in which a first and a second battery carried by said road service vehicle are so connected that both batteries will be charging or discharging at any given time at substantially the same rate and in which current amplifying means are employed in a voltage sensing circuit to determine that correct polarity connections exist between the batteries of the service vehicle and between the booster charger system and the battery of the stalled or disabled vehicle, said voltage sensing means being operative even where the battery of the stalled or disable vehicle has no appreciable voltage.

6 Claims, 4 Drawing Figures

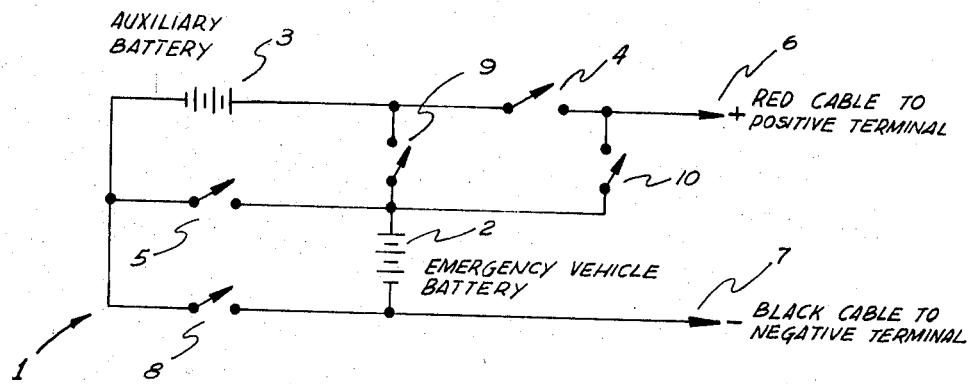
PRIOR ART  FIG. 1
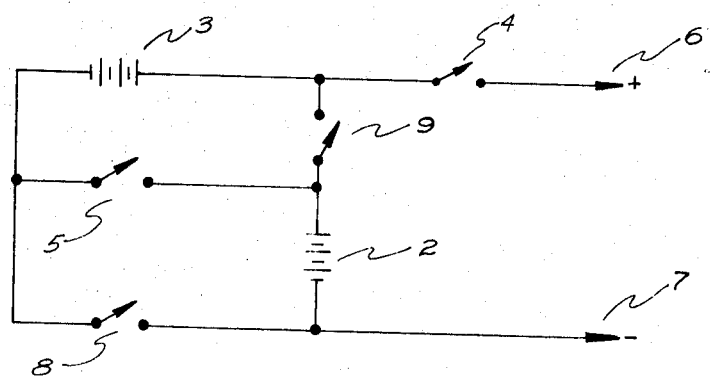
FIG. 2
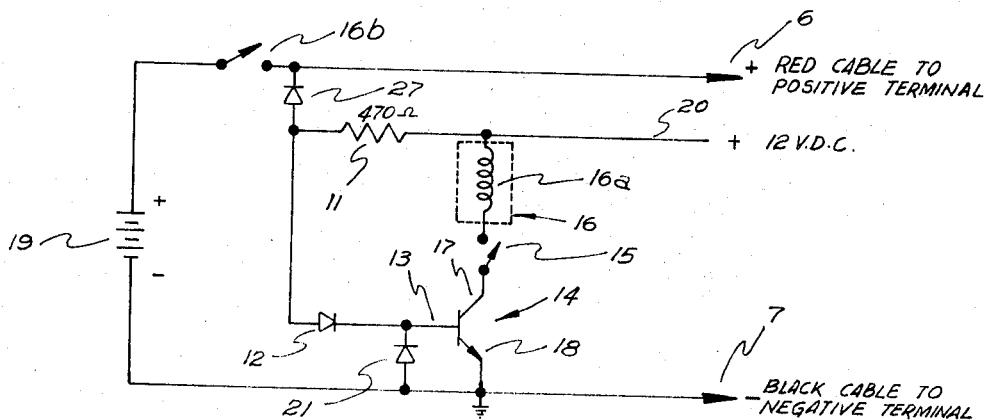
FIG. 3
INVENTOR:
JOSEPH GARDBERG

INVENTOR:
JOSEPH GARDBERG

BATTERY BOOSTER CIRCUIT CONTAINING VOLTAGE SENSING MEANS

BACKGROUND OF THE INVENTION

This invention relates to apparatus for energizing the battery of a stalled or disabled vehicle and to battery booster apparatus having internal means for detecting improper polarity conditions existing on the booster's output cables.

Previous battery boosters have been designed which can be connected across a disabled vehicle's discharged battery for the purpose of starting the disabled vehicle or recharging the battery. It is possible, however, to connect the booster's output cables to the wrong polarity terminals on the discharged battery. When this occurs high electrical currents flow which are destructive to the booster circuitry, as well as the battery being charged.

In the low mode of operation of the typical two battery starter, only the vehicle battery furnishes current for starting the battery of a disabled vehicle. If the jump is a difficult one the vehicle battery is run down while the auxiliary battery of the emergency vehicle remains fully charged. When the jump period is over, there is a high current flow between the vehicle battery and the booster battery. This is also true for the starting of the emergency vehicle itself.

It is an object of the present invention to provide an improved battery booster circuit which can detect improper polarity conditions on its output terminals under low voltage conditions which will not activate previous systems.

It is a further object of the present invention to provide an improved battery boosting apparatus which can connect an emergency vehicle's battery in series with an auxiliary battery for the purpose of delivering a high voltage charging and starting capability, which also provides a convenient means for switching back to low voltage to prevent damage to disabled vehicle battery.

Still another object of the present invention is to provide an improved battery boosting apparatus designed to connect an emergency vehicle's battery in parallel with an auxiliary battery so that the two batteries may be charged simultaneously from the emergency vehicle's charging system.

Yet another object is to provide circuit means for insuring that both batteries of a service vehicle will be charging or discharging at any given time at substantially the same rate.

Other objects will become apparent to those skilled in the art from the following description of the invention.

SUMMARY OF THE INVENTION

The battery booster circuit disclosed herein is designed to be installed in an emergency vehicle to aid in starting disabled vehicles. Jumper cables are connected between the output of the battery booster and the battery in the disabled vehicle. In on e embodiment of the inven tion, a current amplifying voltage sensing circuit is arranged to detect whether the jumper cables have been connected to the proper polarity terminals on the battery in the disabled vehicle even where the battery of the disabled vehicle has no appreciable voltage. A transistor circuit conveniently can be use for this purpose. In one such embodiment the transistor is arranged in the grounded emitter configuration wherein the transistor's emitter is connected to the emergency vehicle's ground. Both the battery booster's negative output terminal and the negative terminal of the emergency vehicle's battery are also connected to ground in the emergency vehicle. A positive 12 volts is supplied through the emergency vehicle's ignition switch and a series connected diode and resistor to the base circuit of the transistor, hereinafter called the polarity checking transistor. The positive output terminal of the battery booster is connected into the base circuit of the polarity checking transistor by means of a diode. When the battery booster's output cables are connected to the proper terminals on the battery in the disabled vehicle, the polarity checking transistor will be in full conduction or saturated. When the battery booster's output cables are connected improperly to the battery terminals in the disabled vehicle, the voltage in the base circuit of the polarity checking transistor will be insufficient to allow the transistor to conduct and the transistor will be cutoff.

An auxiliary battery is also utilized in connection with the battery booster. It is important that the auxiliary battery be properly installed to prevent the flow of destructive electrical currents. When properly installed the negative terminal of the auxiliary battery is referenced to emergency vehicle ground through a resistor. The positive terminal of the auxiliary battery is connected to the base circuit of the polarity checking transistor through a diode. When the auxiliary battery is properly installed the polarity checking transistor will conduct. When the auxiliary battery is improperly installed, the voltage in the base circuit of the polarity checking transistor will be insufficient to cause the transistor to conduct and the transistor will be cutoff.

Four distinct modes of operation characterize a preferred embodiment of the subject invention. These are:
a. the high voltage starting mode;
b. the low voltage starting mode;
c. the charging mode; and
d. the emergency vehicle starting mode.

In the high voltage starting mode, the emergency vehicle's battery and the auxiliary battery are connected in series using relay means. Specifically, when the battery booster's output cables are properly connected to a battery in a disabled vehicle, the polarity checking transistor conducts. A start switch and an activate relay are connected in series with the transistor's collector circuit. When the transistor conducts and the start switch is closed, the start relay will be energized. A mode switch is employed which permits selection of the high or low voltage mode of operation. With the mode switch in the high voltage position, the energizing of the activate relay, in turn, activates other relays which connect the negative terminal on the auxiliary battery to the positive terminal on the emergency vehicle's battery and the positive terminal on the auxiliary battery to the positive output terminal of the battery booster circuit. The high voltage mode is required in those instances where the disabled vehicle is particularly difficult to start.

In the second mode of operation, the low voltage mode, the mode switch is set to the low voltage position. When the activate relay is energized, as described in connection with the high voltage mode of operation, additional relays are activated which connect the emergency vehicle's battery in parallel with the auxiliary battery and also connect the parallel combination of the two batteries to the battery booster's output terminals. The low voltage mode of operation is selected when prolonged cranking of the disabled vehicle's engine is necessary.

In the third mode of operation, the charging mode, it is desirable to connect the emergency vehicle's battery in parallel with the auxiliary battery in order to obtain an equal charge on each battery. Specifically, when no improper polarity conditions appear on the battery booster output terminals and the auxiliary battery is properly installed, the polarity checking transistor will conduct. A charge relay is connected to the collector circuit of the polarity checking transistor in series with a normally closed contact on the activate relay. With the polarity sensing transistor conducting and the activate relay not energized, the charge relay will be energized. When the contacts on the charge relay close, a second relay is activated which connects the emergency vehicle's battery in parallel with the auxiliary battery. In this way both batteries can be charged from the emergency vehicle's charging system.

In the fourth mode of operation, the emergency vehicle's starting mode, the emergency vehicle's battery and the auxiliary battery are connected in parallel while the emergency vehicle is being started. For this purpose, a relay, called an emergency vehicle start relay, is connected in series with a normally closed contact on the activate relay between the collector circuit of the polarity checking transistor and the starter solenoid in the emergency vehicle. When the emergency vehicle is being started and the polarity checking transistor is conducting, the emergency vehicle start relay will be activated. This will, in turn, activate other relays to connect the emergency vehicle's battery in parallel with the auxiliary battery. The parallel battery combination is then available to supply starting current to the emergency vehicle.

Further features and advantages of the invention will become more readily apparent from the following description of a specific embodiment of the invention when taken in conjunction with the accompanying drawings.

BRIEF DESCRIPTION OF THE DRAWINGS

FIG. 1 is an electrical circuit diagram for a typical two battery starting circuit;

FIG. 2 is an electrical circuit diagram illustrating one approach to reducing the high transient current flows characteristic of the circuit described in connection with FIG. 1;

FIG. 3 is an electrical circuit diagram of a polarity checking circuit; and

DESCRIPTION OF THE PREFERRED EMBODIMENT

Figure 4:
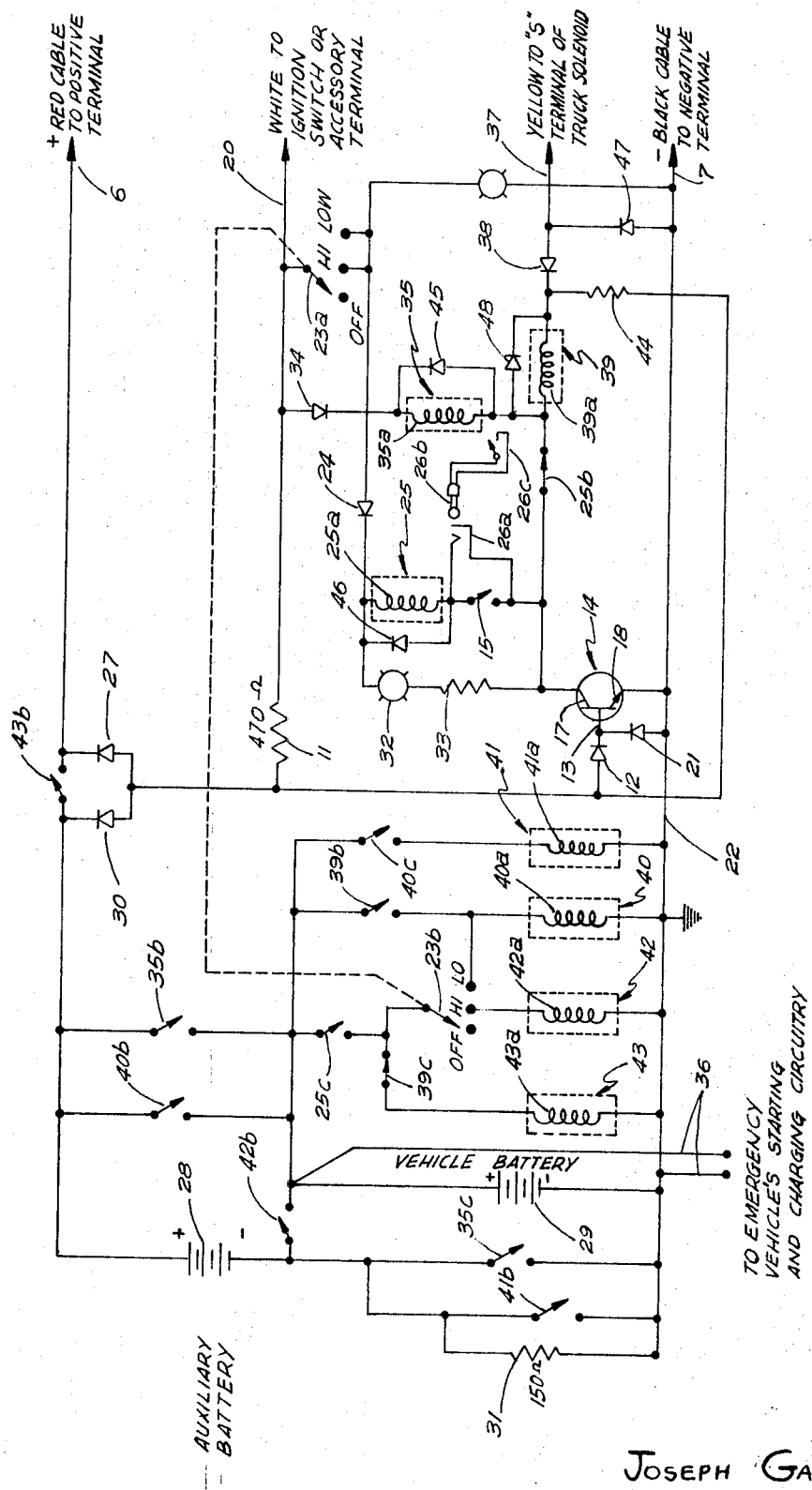
FIG. 4 is an electrical circuit diagram showing one preferred embodimen t of the subject invention.

FIG. 1 is a partial electrical circuit diagram showing a typical two battery starting circuit 1, utilized for starting disabled vehicles which have discharged or partially discharged batteries. Starting circuit 1 is generally installed in an emergency vehicle which is used to provide road service to disabled vehicles. Battery 2, the emergency vehicle battery, and battery 3, an auxiliary battery mounted in the emergency vehicle, are used to provide the electrical energy necessary to start a disabled vehicle with a discharged or partially discharged battery.

In the high voltage mode of operation, i.e., when a high starting voltage is required, it is necessary to connect batteries 2 and 3 in series. This is accomplished by closing switch 5. Closure of switch 4 then connects the positive terminal of battery 3 to cable 6. Thus, where batteries 2 and 3 are 12 volts each, the voltage across jumper cables 6 and 7 will be 24 volts. When jumper cables 6 and 7 are connected to a discharged 12 volt battery, the current flow is limited by the total resistance of the circuit. Consequently, the size of the jumper cables is selected to limit the current flow in the circuit to some desired maximum value. When batteries 2 and 3 are connected in series, the same current flows in each battery and the rate of discharge is the same.

After the jumper cables are disconnected from the battery in the disabled vehicle, switches 4 and 5 are opened and switches 8 and 9 are closed. Thus, batteries 2 and 3 are placed in parallel, and consequently, both batteries may be recharged from the emergency vehicle's charging system not shown). This insures that both batteries are always at the same state of charge.

In the low voltage mode of operation, wherein only a low starting voltage is required, switch 10 is closed and switches 4, 5, 8, and 9 remain open. Thus, only the emergency vehicle's battery 2 is connected to jumper cables 6 and 7. If there is difficulty in starting the disabled vehicle, the emergency vehicle's battery 2 will become discharged, while the auxiliary battery 3 remains fully charged. When cables 6 and 7 are removed from the battery in the disabled vehicle and switches 8 and 9 are closed, high currents flow between the auxiliary battery 3 and the emergency vehicle battery 2. These high currents are not desirable since they would require high current contactors for the charging circuit with attending large holding currents increasing the load on the generator.

The circuit indicated in FIG. 2 eliminates the high currents described in connection with FIG. 1 which flow between auxiliary battery 3 and the emergency vehicle's battery 2 after starting a disabled vehicle in the low voltage mode of operation. When it is desired to perform a low voltage starting operation, switches 4, 8 and 9 are closed. This parallels batteries 2 and 3. During the starting operation both batteries are discharged equally. Consequently, when the low voltage starting operation is complete, both batteries being in parallel and at the same level of discharge, high currents will not flow between them.

During the start of a disabled vehicle it is necessary to place jumper cables 6 and 7, described in connection with FIGS. 1 and 2, on the correct terminals of the battery in the disabled vehicle. If the jumper cables are placed on the wrong terminals, i.e., with the wrong polarity, the starting apparatus can be damaged. A partial circuit diagram of a polarity checking circuit is shown in FIG. 3.

With jumper cable 6 placed on the positive terminal of the battery (not shown) in the disabled vehicle and cable 7 placed on the negative terminal of said battery, current will flow from the +12 volt DC source 20 through resistor 11 and diode 12 into the base 13 of transistor 14. Under these circumstances, transistor 14 will become saturated and when switch 15 is closed, current will flow from the +12 volt DC source 20 through relay coil 16a and switch 15 into collector 17 of transistor 14. Since transistor 14 is saturated, the current will pass through transistor 14 exiting at emitter 18 which is connected to ground. When relay coil 16a is energized, relay 16 will operate causing contact 16b on relay 16 to close. The closure of contact 16b connects battery 19 to cable 6, thereby permitting current to flow from battery 19 through cable 6 into the battery in the disabled vehicle. The return path for the current flow from battery 19 is through cable 7 into the negative terminal of battery 19.

If cables 6 and 7 are placed on terminals of the wrong polarity in the disabled vehicle, the potential at the junction of diodes 12 and 27 and resistor 11 will be negative. Consequently, no current will flow into the base 13 of transistor 14 and transistor 14 will remain in the nonconducting or cutoff condition. Thus, when switch 15 is closed, relay coil 16a will not be energized since transistor 14 is in the cutoff state and the necessary current to operate relay 16 cannot flow. Since relay 16 will not operate, contact 16b will not close and battery 19 will not, therefore, be connected to cable 6. Thus, damage to battery 19 will not occur as a result of being connected across a battery of opposing polarity.

The circuit described in connection with FIG. 3 is incorporated in the preferred embodiment of the battery booster circuit illustrated in FIG. 4. In FIG. 4, when battery cables 6 and 7 are connected properly to terminals of the correct polarity on a battery in a disabled vehicle, base current for polarity checking transistor 14 will flow from lead 20, which is connected to the positive side of the emergency vehicle's battery 29 through the emergency vehicle's ignition switch (not shown), through resistor 11 and diode 12 into base 13 of transistor 14, and thence through the emitter 18 into the negative bus 22, causing transistor 14 to be in the saturated state. When transistor 14 is saturated, the voltage from collector 17 to emitter 18 will approach 0 volts for the value of collector current required in this circuit. The cathode side of diode 12 is connected as shown to base 13. Diode 21 is connected between base 13 and negative bus 22, the cathode side of diode 21 being connected to base 13. Negative bus 22 is connected to vehicle ground. Diode 21 is utilized to provide proper biasing conditions for transistor 14 and also to provide a path for the recovery current which instantly flows through diode 12 when a wrong polarity sensing is made. Thus, if switch 23a, a three position switch, is either in the HI or LO position and either switch 15 or remote switch 26c are closed, current will flow from lead 20 through switch 23a, diode 24, relay coil 25a of relay 25, either switch 15 or remote switch 26a, into collector 17, thence through transistor 14 and out of emitter 18 into negative bus 22. Remote switch 26c is connected to the battery booster circuit by means of plug 26b and jack 26a. The current flowing through relay coil 25a will energize relay 25.

If, on the other hand, c ables 6 and 7 are connected to terminals of the wrong polarity on the battery in the disabled vehicle, diode 27 will conduct and the base current necessary to saturate transistor 14 will be diverted through diode 27. Consequently, relay 25 will not operate when either switch 15 or remote switch 26c are closed.

When properly installed, the negative terminal of auxiliary battery 28 is connected through a 150 ohm resistor 31 to negative bus 22. Clearly, the wrong polarity installation of auxiliary batter 28 would be distinctive in any paralleling of auxiliary battery 28 and emergency vehicle battery 29. If the auxiliary battery 28 is installed such that its polarity is reversed, the base current necessary to saturate transistor 14 will be diverted through diode 30 into the reversed auxiliary battery 28. Again, relay 25 will not operate when auxiliary battery 28 is reversed, since transistor 14 will be nonconducting or cutoff. The anode sides of diodes 27 and 30 are connected as shown to the junction of resistor 11 and diode 12. From the foregoing description, it should be clear that relay 25 can only be operated when auxiliary battery 28 is properly installed and cables 6 and 7 are not connected to battery terminals of improper polarity. Correct polarity lamp 32 and series resistor 33 are connected in parallel with relay coil 25a and switch 15 to provide an indication that the correct polarity conditions exist. When correct polarity exists, current flows from lead 20, through switch 23a, diode 24, lamp 32, resistor 33 and saturated transistor 14, into the negative bus 22. In the circuitry described, lamp 32 will light only when transistor 14 is saturated.

Four distinct modes of operation are possible with the battery booster circuit. In the charging mode it is necessary to connect batteries 28 and 29 in parallel. When the emergency vehicle's ignition switch is turned on, a positive 12 volt DC will appear on lead 20. When the auxiliary battery 28 has been properly installed and cables 6 and 7 are not connected to terminals of the wrong polarity, current will flow through diode 34, relay coil 35a and, if switch 15 or remote switch 26c are not closed, through the normally closed contact 25b of relay 25 into collector 17, thence through transistor 14, out of emitter 18 into negative bus 22. Under these conditions, relay 35 will operate causing contacts 35b and 35c on relay 35 to close. This places battery 28 in parallel with battery 29 insuring that the charging voltage appearing across leads 36 will likewise appear across batteries 28 and 29. In this manner both batteries will maintain the same state of charge.

In the emergency vehicle starting mode it is necessary to parallel batteries 28 and 29 while the emergency vehicle is being started, so that both batteries contribute to the starting of the emergency vehicle, and also, so that both batteries will be equally discharged. Again, if the auxiliary battery 28 is properly installed and cables 6 and 7 are not connected to terminals of the wrong polarity, transistor 14 will be in the saturated state. While the emergency vehicle is being started, current will flow out of lead 37, which is connected to the "S" terminal of the emergency vehicle's starter solenoid, through diode 38, relay coil 39a, and, if switch 15 or remote switch 26c are not closed, through the normally closed contacts 25b of relay 25 into collector 17, thence through saturated transistor 14, and out of emitter 18 into negative bus 22. Since a positive 12 volts may not be present on lead 20 if said lead 20 is connected to the accessories terminal instead of the ignition switch during starting of the emergency vehicle, but is present on lead 37, base current necessary to saturate transistor 14 is supplied through resistor 44. Resistor 44 is connected between the anode side of diode 12 and the cathode side of diode 38. The current passing through relay coil 39a will cause relay 39 to operate closing contact 39b on relay 39. The closure of contact 39b allows current to pass through relay coil 40a. Relay 40 will then operate closing contacts 40b and 40c on relay 40. Closure of contact 40c allows current to pass through relay coil 41a, thereby operating relay 41 and closing contact 41b on relay 41. The closure of contact 40b connects the positive terminals of batteries 28 and 29 together. Closure of contact 41b connects the negative terminal of battery 28 to negative bus 22. Thus, batteries 28 and 29 are connected in parallel permitting both batteries to be used in starting the emergency vehicle. The starting current will flow over leads 36.

In the third mode of operation, the high voltage starting mode, switches 23a and 23b are set to the high position. If the auxiliary battery has been properly installed and jumper cables 6 and 7 are connected to the proper battery terminals in the stranded vehicle, closure of either switch 15 or remote switch 26c, will energize relay 25 causing normally closed contact 25b on relay 25 to open and normally open contact 25c on relay 25 to close. With switch 23b in the HI position and contact 25c on relay 25 closed, current will flow through relay coil 42a thereby causing relay 52 to operate and contact 42b on relay 42 to close thereby connecting the positive terminal of battery 29 to the negative terminal of battery 28. Thus, batteries 28 and 29 will be connected in series. Current will also flow through contact 25c on relay 25, normally closed contact 39c of relay 39, and relay coil 43a, into the negative bus 22. Current passing through relay coil 43a will energize relay 43 causing contact 43b on relay 43 to close, thereby connecting the positive terminal of battery 28 to jumper cable 6. Thus, for those situations requiring a high starting voltage, the series connected output voltage from batteries 28 and 29 is available across jumper cables 6 and 7.

In the fourth mode of operation, the low voltage starting mode, switches 23a and 23b are set in the LO position. When switch 15 or remote switch 26c is closed and transistor 14 is saturated, relay 25 will operate opening contact 25b on relay 25 and closing contact 25c on relay 25. Current will then flow through contact 25c, switch 23b, and relay coil 40a into the negative bus 22. Relay 40 will operate causing contacts 40b and 40c on relay 40 to close. When contact 40c closes, relay 41 will operate closing contact 41b on relay 41. Batteries 28 and 29 will thus be connected in parallel. Current will also flow through contact 25c, normally closed contact 39c, and relay coil 43a into negative bus 22. Relay 43 will operate closing contact 43b on relay 43, thereby connecting the positive terminal on battery 28 to cable 6. By operating the batteries in parallel, both batteries discharge at the same rate.

A safety feature incorporated into the present invention is embodied in normally closed contact 39c on relay 39. During the period that the emergency vehicle is being started, relay 39 is operated causing contacts 39c to open. Thus, relay 43 is prevented from operating while the emergency vehicle is being started, and no current will be supplied to jumper cable 6 during this period. This is particularly important since the jumper cables may by lying loose in the emergency vehicle, and if they were energized while the emergency vehicle was being started, short circuit currents could flow.

Diodes 45, 46, 47, and 48 are utilized to reduce transients by providing a shunt path for coil currents when relays 25, 35, and 39 are de-energized.

While the foregoing description has referred to a specific embodiment of the invention, it will be apparent that many modifications and variations may be made therein without departing from the spirit and scope of the invention.

I claim:

1. A battery booster circuit for use with a road service vehicle comprising, in combination:
   a. a first battery means having positive and negative terminals;
   b. a second battery means having positive and negative terminals, the negative terminal on said second battery means being connected to ground;
   c. first and second output cables, said first output cable being connected to ground;
   d. current amplifying voltage sensing means having inputs operatively connected to said second output cable and also to said first battery means, the output of said voltage sensing means being arranged to indicate whether said first battery means and said second output cable having been properly connected; and
   e. control means operatively connected to the output of said voltage sensing means, said control means being arranged to connect said first and second batteries in series and parallel combinations to said output cables, said control means also being arranged to connect said first and second batteries in parallel to the road service vehicle's starting and charging systems when said batteries are not connected to said output cables.

2. A battery booster circuit in accordance with claim 1 wherein said voltage sensing means comprises:
 a. a current amplifying means connected to be driven by current from the road service vehicle ignition switch or an accessory circuit operable with the engine of the road service vehicle;
 b. diode means connected to the output cable such that improper connection of the output cable to the emergency vehicle will prevent the operation of the amplifier and thus the means of operation; and
 c. diode means connected to the first battery means such that improper installation of said first battery will defer the drive current from the amplifier such as to prevent the paralleling of said first and second battery means for either charging or starting.

3. A battery booster circuit in accordance with claim 1 wherein said control m e ans includes, in addition:
 a. a normally open switch;
 b. a first relay means having a coil and a pair of normally open contacts, said coil and said switch being connected in series between the output of said voltage sensing means and the ignition switch in said road se rvice vehicle;
 c. a second relay means having a coil and a pair of normally open contacts, said coil and the pair of normally open contacts on said first relay means being connected in series between ground and the positive terminal on said second battery means, the pair of normally open contacts on said second relay means being arranged to connect the positive terminal of said second battery means to the negative terminal of said first battery means; and
 d. a third relay means having a coil and a pair of normally open contact, said coil and the pair of normally open contacts on said first relay means being connected in series between ground and the positive terminal on said second battery means, the pair of normally open contacts on said third relay means being arranged to connect the positive terminal of said first relay means to said second output cable, wherein said first relay means will operate when said switch is closed, said first relay mean causing said second and third relay means to operate, thereby connecting said batteries in series with said output cables.

4. A battery booster circuit in accordance with claim 1 wherein said control means includes, in addition:
 a. a normally open switch;
 b. a first relay means having a coil and a pair of normally open contacts, said coil and said switch being connected in series between the output of said voltage sensing means and the ignition switch in said road service vehicle;
 c. a second relay means having a coil and a first and second pair of normally open contacts, said coil and the pair of normally open contacts on said first relay means being connected in series between ground and the positive terminal on said second battery means, the first pair of normally open contacts on said second relay means being arranged to connect the positive terminals of said first and second batteries together;
 d. a third relay means having a coil and a pair of normally open contacts, said coil and the second pair of contacts on said second relay means being connected in series between ground and the positive terminal on said second battery means, the pair of contacts on said third relay means being arranged to connect the negative terminal on said first battery means to ground; and
 e. a fourth relay means having a coil and a pair of normally open contacts, said coil and the pair of contacts on said first relay means being connected in series between ground and the positive terminal on said second battery, the pair of contacts on said fourth relay means being arranged to connect the positive terminal on said first battery to said second output cable, whereby said batteries are connected in parallel with said output cables.

5. A battery booster circuit in accordance with claim 1 wherein said control means includes, in addition:
 a. a first relay means having a coil and a pair of normally closed contacts, said first relay means being activated while said battery booster circuit is being used to service a disabled vehicle;
 b. a second relay means having a coil and a first and second pair of normally open contacts, said coil and the pair of normally closed contacts on said first relay means being connected in series between the output of said voltage sensing means and the ignition switch in said road service vehicle, the first pair of contacts on said second relay means being arranged to connect the negative terminal on said first battery means to ground, the second pair of contacts on said second relay means being arranged to connect the positive terminals on said first and second batteries together; and
 c. means for operatively connecting said second battery means to the charging system in said road service vehicle, whereby said batteries will be connected in parallel to the road service vehicle's charging system when said battery booster circuit is not being used to service a disabled vehicle.

6. A battery booster circuit in accordance with claim 1 wherein said control means includes, in addition:
 a. a first relay means having a coil and a pair of normally closed contacts, said first relay means being activated while said battery booster circuit is being used to service a disabled vehicle;
 b. a second relay means having a coil and a pair of contacts, said coil and the pair of normally closed contacts on said first relay means being connected in series between the output of said voltage sensing means and the "S" terminal on the solenoid in the road service vehicle;
 c. a third relay means having a coil and a first and second pair of normally open contacts, said coil and the pair of contacts on said second relay means being connected in series between ground and the positive terminal on said second battery means, said first pair of contacts on said third relay means being arranged to connect the negative terminal of said first battery means to ground;
 d. a fourth relay means having a coil and a pair of normally open contacts, said coil and the second pair of contacts on said third relay means being connected in series between ground and the positive terminal on said second battery means, the pair of contacts on said fourth relay means being arranged to connect the positive terminals on said first and second batteries together; and
 e. means for operatively connecting said second battery to the starting system in said road service vehicle, whereby said batteries will be connected in parallel to the road service vehicle's starting system.

* * * * *